United States Patent [19]
Watson

[11] Patent Number: 5,620,121
[45] Date of Patent: Apr. 15, 1997

[54] QUICK RELEASING SUPPORT FOR LINE TRIMMERS

[76] Inventor: Elton G. Watson, 209 W. Ellawood Ave., Cedartown, Ga. 30125

[21] Appl. No.: 443,239

[22] Filed: May 17, 1995

[51] Int. Cl.$^6$ ........................................... A45F 5/00
[52] U.S. Cl. ........................ 224/272; 224/197; 224/270; 224/271; 224/904; 172/370; 56/12.7; D8/8
[58] Field of Search ........................ 224/269–272, 224/904, 197; 172/370; 56/12.7; D8/8; 30/296.1

[56] References Cited

U.S. PATENT DOCUMENTS

| | | | |
|---|---|---|---|
| 2,506,685 | 5/1950 | Sadloski et al. | 224/197 |
| 2,603,134 | 9/1952 | Burnam | 224/270 |
| 2,743,894 | 5/1956 | Ostnas | 224/271 |
| 3,346,955 | 10/1967 | Beneke | 30/296.1 |
| 5,364,307 | 11/1994 | Shaulis | 56/12.7 |
| 5,489,051 | 2/1996 | Robinson | 224/904 |

Primary Examiner—David J. Walczak
Assistant Examiner—Timothy L. Maust
Attorney, Agent, or Firm—Jones & Askew

[57] ABSTRACT

A quick-releasing pivoting support for a line trimmer, which includes the use of a detachable interconnection such as a ball-and-socket to at least partially support the weight of a line trimmer while still allowing pivoting of the trimmer. In the case of an emergency, the trimmer may be simply lifted upwardly while still keeping both hands on the trimmer and quickly discarded by the operator.

13 Claims, 2 Drawing Sheets

QUICK RELEASING SUPPORT FOR LINE TRIMMERS

TECHNICAL FIELD

This invention relates in general to hand held devices, and particularly relates to a quick releasing feature of a support for a line trimmer, which makes the trimmer safer, easier to maneuver, easier to operate, and more comfortable to use.

BACKGROUND OF THE INVENTION

The invention generally relates to the use of a detachable interconnection between the shaft of line trimmer (or other similar device) and a user's body, which allows the line trimmer to be pivotably supported by the user's body in a desirable manner, but quickly detached relative to the user should the need arise due to an emergency.

In the field of hand-held lawn maintenance tools, it is known to provide a shoulder or other such strap with a "hook" on one end, in order to allow the hook to engage a loop or other similar mating element fixed relative to the shaft of a line trimmer or other similar device. Such an arrangement is shown in U.S. Pat. No. 5,364,307 to Shaulis. However, it is submitted that such hooks typically require the operation of one or both hands of the operator in order to facilitate such disengagement. This may be acceptable if the operator is in no particular hurry, such as when a rest break needs to be taken. However, should an emergency such as an engine fire occur, time may be of the essence in providing a quick disengagement of the unit from the body of the user. Latch-type devices such as shown in U.S. Pat. No. 5,364,307 do not provide such needed detachment and could thusly be considered dangerous.

SUMMARY OF THE INVENTION

The present invention overcomes inadequacies in the prior art by providing an improved support apparatus for a line trimmer or other hand-held powered device which provides at least partial support for a trimmer while still allowing the trimmer to be quickly and simply separate from the user should an emergency occur.

Generally described, the present invention provides a interconnection feature between a collar member attached to the shaft of a line trimmer or other similar device, which interconnects in a pivoting and/or swiveling manner with a holster or other similar device operably attached relative to the body of an operator.

More particularly described, the present invention relates to a quickly-detachable ball-and-socket interconnection between a collar attached to the shaft of a line trimmer, and a holster operably attached to the body of a user.

Therefore, it is an object of the present invention to provide an improved interconnection feature between a line trimmer (or other similar device) and the body of and operator.

It is a further object of the present invention to provide such an interconnection which is readily detached.

It is a further object of the present invention to provide such an interconnection which is easily adjustable.

It is a further object of the present invention to provide such an interconnection which is simple and comfortable to operate.

It is a further object of the present invention to provide such an interconnection which is simple to maintain.

It is a further object of the present invention to provide such an interconnection which is simple to manufacture.

It is a further object of the present invention to provide such an interconnection which includes an improved safety feature.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIGS. 2A and 2B are generally illustrative views of a second detachable connection 20 according to the present invention, with FIG. 2A illustrating the connection disengaged, and FIG. 2B illustrating the connection engaged.

DETAILED DESCRIPTION OF THE PREFERRED EMBODIMENT

Reference is now generally made to the drawings. As may be seen, like numerals correspond to like items throughout the several views.

Figure 3:
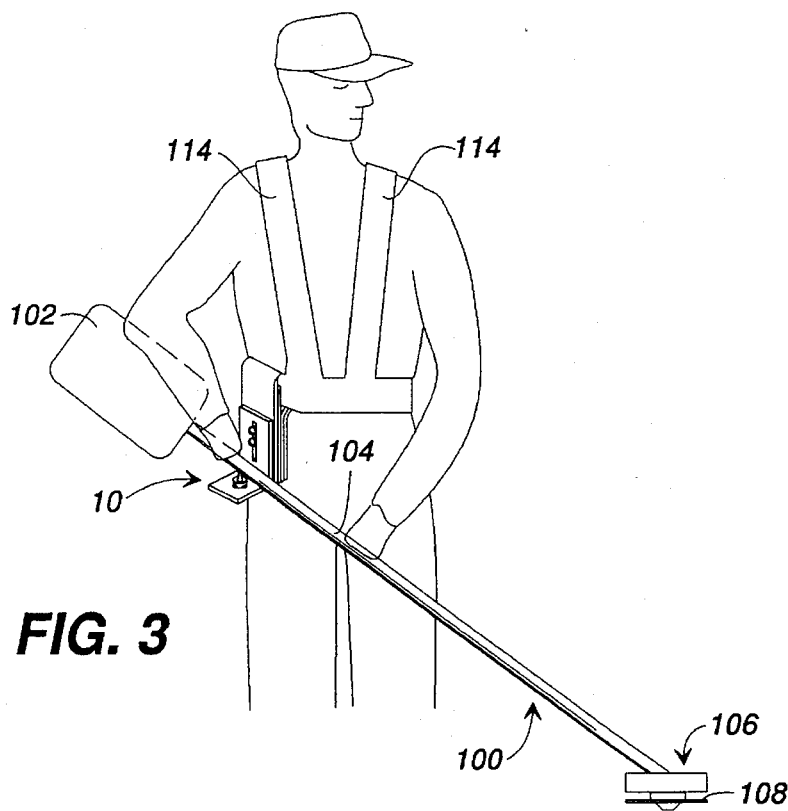
FIG. 3 is an illustrative view showing an operator using a line trimmer with the aid of a detachable connecting assembly according to the present invention.

Reference is first made to FIG. 3, which illustrates the overall environment including the invention. As may be seen, a human operator is shown holding a line trimmer 100, which includes an elongate shaft 104 intermediate and connecting a motor 102 and a cutting head 106 including cutting line 108. A quick-releasing trimmer support assembly 10 is used to support at least part of the weight of the line trimmer 100, while still allowing the line trimmer 100 to be pivoted and/or swiveled relative to the user's body to facilitate the normal trimming process.

Figure 1A:
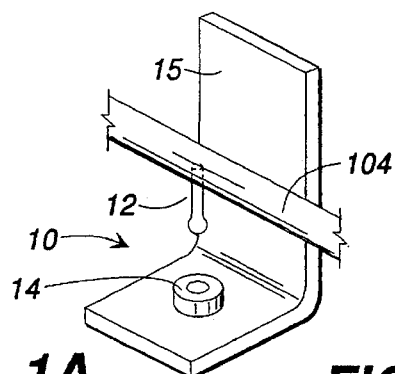
FIGS. 1A and 1B are generally illustrative views of a first detachable connection 10 according to the present invention, with FIG. 1A illustrating the connection disengaged, and FIG. 1B illustrating the connection engaged.
Figure 1B:
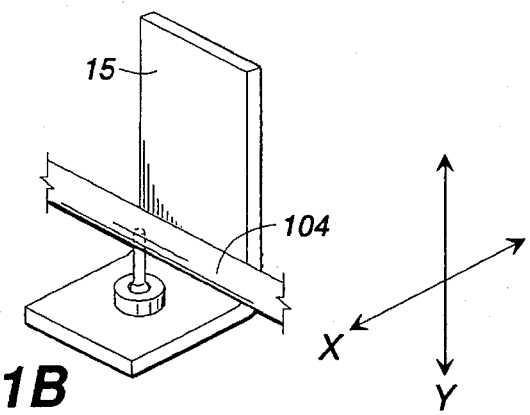

Reference is now also made to FIGS. 1A and 1B, which generally illustrate a first embodiment of the present invention, which utilize a "ball-and-socket" interconnection between a protruding member 12 and a recessed member 14, both being part of the quick release support assembly 10, which also includes a supporting holster 15. The downwardly-protruding member 12 is rigidly attached relative to the line trimmer shaft 104 as discussed later in this application, and is receivably supported by the recessed member 14, which is fixed relative to the holster 15. As discussed in detail later, the holster 15 is supported by the operator's body by straps, belts, or the like.

As may be understood, the ball-and-socket interconnection allows the shaft to pivot in a direction such as Y as shown in FIG. 1B, and rotate or "swivel" in a direction such as X shown in FIG. 1B. This interconnection allows for several degrees of freedom of movement, which is clearly advantageous.

Figure 2B:
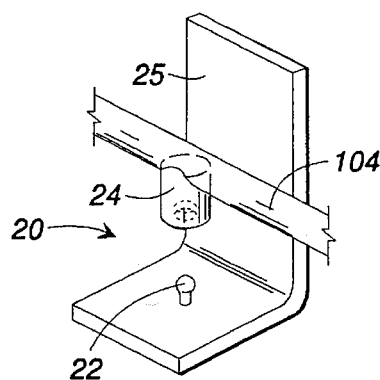
Figure 2B:
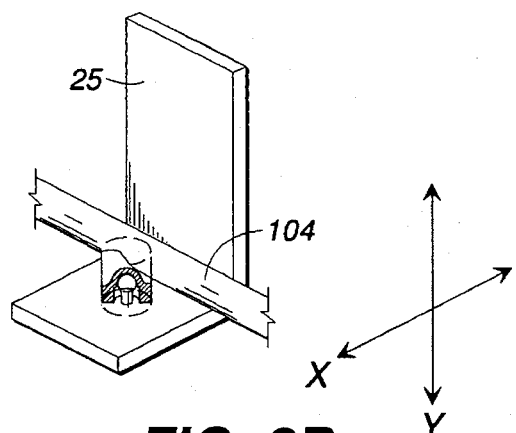

As may be seen, the second embodiment of the invention shown in FIGS. 2A and 2B operates in a manner similar to that discussed relative to the first embodiment, except it can be seen that the ball-and-socket interconnection is inverted to include the use of an upwardly-protruding member 22 attached relative to the holster 25, which is accepted by and supports a receiving member 24 attached relative to the trimmer shaft 104. As before, this ball-and-socket interconnection is advantageous, as it allows the operator to raise and lower the trimmer head by pivoting the shaft along the "Y" direction (see FIG. 2B) and swiveling (which could also be considered "rotating") the shaft as shown by "X", to facilitate the side-to-side movement so often associated with such trimmers.

Reference is now made to FIG. 3 to discuss support of the holster by the operator. This can be done by the use of either a belt 110, or a shoulder strap or a combination of the two. Suspenders such as 114 could also be used in lieu of the shoulder strap when used in combination with the belt. A clip could also be incorporated into the holster to allow it to be releasably clipped to the operator's belt or pants.

Figure 4:
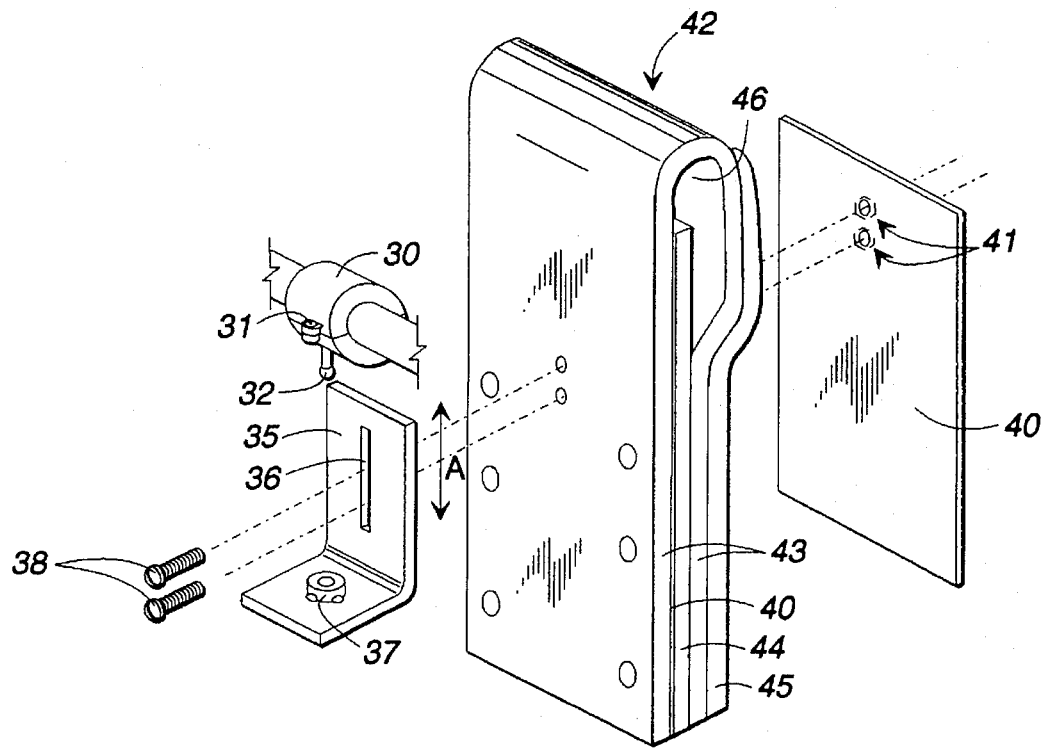
FIG. 4 is a partially exploded, partially illustrative view illustrating the cooperation of a shaft-mounted protruding member with a holster-mounted recessed member. A plate member is shown twice, in its installed and isolated position.

Reference is now made to FIG. 4, which shows a connecting arrangement corresponding to that shown in FIGS. 1A and 1B. Shown is a split connecting collar 30 which can be attached by a tightening screw 31 or as otherwise known in the art to the shaft 104 of a conventional line trimmer. The connecting collar 30 attaches a protruding member 32 relative to the shaft 104. This protruding member can consist essentially of a ball mounted to one end of a shaft having its other end attached to the collar.

The extending member 32 is accepted and supported by a receiving member 37 (which could consist of a collar or bushing of metal or plastic) attached to a L-shaped bracket 35 defining an elongate adjustment slot 36 extending longitudinally along the "A" direction. Typical fasteners 38 extend through the slot 36 and are accepted by threaded holes 41 of a plate member 40, which is riveted or otherwise fastened in a "sandwich" fashion to the holster body, which includes a pair of straps 43, 44 and a hip cushion 45 which will contact the operator. A belt loop 46 is thus provided.

As may be understood, the slot 36 allows for relative adjustment of the bracket (and thus the receiving member) along direction "A", which is an advantageous feature of the invention, and can be used to reduce back or other muscle fatigue.

Figure 5:
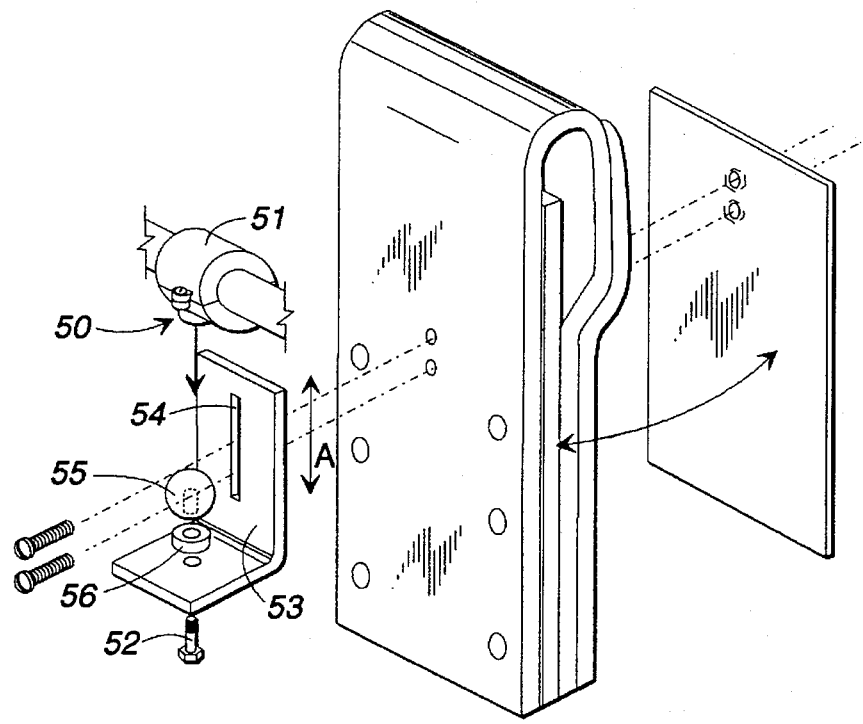
FIG. 5 is a partially exploded, partially illustrative view illustrating the cooperation of a shaft-mounted protruding member with a holster-mounted recessed member. A plate member is shown twice, in its installed and isolated position.

The interconnection scheme described in reference to FIGS. 2A and 2B may be provided by the hardware shown in FIG. 5, which includes a protrusion-receiving collar 50 attached to the shaft-receiving collar 51, and a bolt 52 which interconnects a slotted L-shaped bracket 53 to a spacer 56, and a support ball-shaped protrusion 55. Again the same vertical adjustment feature is provided.

Alternatives and Options

The belts and straps can be made of leather, nylon or other suitable material. The padding on the holster may be lamb's wool, foam rubber, or other suitable padding.

Conclusion

It should be understood that the term "line" as used in this application is not restricted to monofilament line, line can also be used to describe a line of metal links, blades, or other elements.

While this invention has been described in specific detail with reference to the disclosed embodiments, it will be understood that many variations and modifications may be effected within the spirit and scope of the invention as described in the appended claims.

What is claimed is:

1. A support apparatus for a vegetation trimmer having a shaft and a rotating cutting head adjacent one end of said shaft, said support apparatus comprising:

a holster configured for support by the human body;

a detachable collar for attachment around said shaft of said trimmer, said detachable collar configured to support at least a portion of said weight of said trimmer;

interconnection means comprising a ball and socket, wherein one of said collar and said holster is substantially rigidly attached relative to said ball so as to be substantially stationary therewith, and the other of said collar and said holster is substantially rigidly attached relative to said socket so as to be substantially stationary wherewith, such that said trimmer may be attached relative to said holster in a ball and socket interconnection allowing said trimmer to be at least partially pivoted relative to said holster, and such that said trimmer may be lifted generally upwardly to disengage said ball and socket connection to disengage said trimmer from said holster.

2. The apparatus as claimed in claim 1, wherein said ball is attached relative to said trimmer and said socket is attached relative said holster.

3. The apparatus as claimed in claim 1, wherein said socket is attached relative to said trimmer and said ball is attached relative said holster.

4. The apparatus as claimed in claim 1, further comprising a belt for attaching said holster relative to said human body.

5. The apparatus as claimed in claim 1, further comprising a shoulder strap for attaching said holster relative to said human body.

6. A trimmer support assembly for at least partially supporting the weight of a vegetation trimmer having a shaft and a cutting head proximate one end of said shaft while being held by an operator, comprising:

a holster member;

means for attaching said holster member to the body of said operator; and quick-releasing pivoting interconnection means including a protruding member having a tip and a recessed member configured to accept said tip while allowing relative pivoting therebetween, one of said protruding and recessed members being substantially rigidly attached relative to said holster so as to be substantially stationary therewith, and the other of said protruding and recessed members being substantially rigidly attached relative to said trimmer so as to be substantially stationary therewith, such that at least part of the weight of said trimmer is transferred through said interconnection means to said holster and further to said operator while said trimmer is still allowed to pivot relative to said holster, and such that said trimmer may be detached relative to said holster by lifting it upwardly.

7. The assembly as claimed in claim 6, wherein the pivot point between said protruding and recessed members is below said longitudinal axis of said shaft of said trimmer.

8. A trimmer support assembly for transferring at least part of the weight of a vegetation trimmer to an operator while said trimmer is being held by an operator, comprising:

a holster member configured to be supported by said operator;

a protruding member having a tip; and a recessed member configured to accept said tip while allowing relative pivoting therebetween, one of said protruding and recessed members being substantially rigidly attached relative to said holster so as to be substantially stationary therewith, and the other of said protruding and recessed members being substantially rigidly attached relative to said trimmer so as to be substantially stationary therewith, such that at least part of the weight of said trimmer is transferred through said interconnection means to said holster and further to said operator while said trimmer is still allowed to pivot relative to said holster, and such that said trimmer may be detached relative to said holster by lifting it upwardly.

9. A hand-held apparatus for trimming grass or other vegetation, comprising:

a trimmer having a shaft;

a holster configured for support by the human body;

a detachable collar for substantially rigid attachment around said shaft of said trimmer, said detachable collar configured to support at least a portion of said weight of said trimmer; and interconnection means comprising a ball and socket, wherein one of said collar and said holster is substantially rigidly attached to said ball, and the other of said collar and said holster is substantially rigidly attached to said socket, such that said trimmer may be pivotably attached relative to said holster in a ball and socket interconnection allowing said trimmer to be at least partially pivoted relative to said holster, and such that said trimmer may be lifted generally upwardly to disengage said ball and socket connection to disengage said trimmer from said holster.

10. A support apparatus for a vegetation trimmer having a shaft, said apparatus comprising:

a holster configured for support by the human body;

a detachable collar for attachment around said shaft of said trimmer, said detachable collar configured to support at least a portion of said weight of said trimmer;

interconnection means comprising a ball and socket, wherein said socket is attached relative to said trimmer so as to be substantially stationary therewith, and said ball is attached relative said holster so as to be substantially stationary therewith, such that said trimmer may be attached relative to said holster in a ball and socket interconnection allowing said trimmer to be at least partially pivoted relative to said holster, and such that said trimmer may be lifted generally upwardly to disengage said ball and socket connection to disengage said trimmer from said holster.

11. The application as claimed in claim 10, further comprising a belt for attaching said holster relative to said human body.

12. The application as claimed in claim 10, further comprising a shoulder strap for attaching said holster relative to said human body.

13. A trimmer support assembly for at least partially supporting the weight of a vegetation trimmer while being held by an operator, said trimmer having a shaft and a rotatable vegetation cutting head, comprising:

a holster member;

means for attaching said holster member to the body of said operator; and quick-releasing pivoting interconnection means including a protruding member having a tip and a recessed member configured to accept said tip while allowing relative pivoting therebetween, one of said protruding and recessed members being attached relative to said holster, and the other of said protruding and recessed members being attached relative to said trimmer, wherein the pivot point between said protruding and recessed members is below said longitudinal axis of said shaft of said trimmer.

such that at least part of the weight of said trimmer is transferred through said interconnection means to said holster while said trimmer is still allowed to pivot relative to said holster to facilitate cutting by said cutting head, and such that said trimmer may be detached relative to said holster by lifting it upwardly.

* * * * *